United States Patent [19]

Rosenthal

[11] Patent Number: 5,287,455
[45] Date of Patent: Feb. 15, 1994

[54] ROM SOCKET COMMUNICATION DEVICE FOR DATA TRANSFER BEWEEN A HOST COMPUTER AND A MICROPROCESSOR BASED SYSTEM

[76] Inventor: Lawrence D. Rosenthal, 6845 Aiken Dr., Oakland, Calif. 94611

[21] Appl. No.: 694,944

[22] Filed: May 2, 1991

Related U.S. Application Data

[63] Continuation-in-part of Ser. No. 81,908, Aug. 5, 1987, abandoned.

[51] Int. Cl.$^5$ .............................................. G06F 15/16
[52] U.S. Cl. ........................... 395/200; 364/DIG. 2; 364/930; 364/931.4; 364/931.49
[58] Field of Search .............. 395/325, 200, 425, 500, 395/800

[56] References Cited

U.S. PATENT DOCUMENTS

| | | | |
|---|---|---|---|
| 4,218,740 | 8/1980 | Bennett et al. | 364/200 |
| 4,366,553 | 12/1982 | Spangler et al. | 364/900 |
| 4,368,515 | 1/1983 | Nielsen | 364/200 |
| 4,390,963 | 6/1983 | Puhl et al. | 364/900 |
| 4,495,567 | 1/1985 | Treen | 364/200 |
| 4,691,316 | 9/1987 | Phillips | 371/20 |

OTHER PUBLICATIONS

Electronic Fun–Computers & Games, "Atari, Mattel, Coleco . . . How the Add-Ons Add Up", 1983, pp. 33–38, 97.
Falk, "Emulators Keep Pace with Chip Speeds and Complexity," 1987, Computer Design, System Tech.-/Design and Dev. Tools, pp. 31–38.
Walsh, "Board Testers Mimic CPU for Improved Results," 1987, Computer Design, System Design/Design and Dev. Tools, pp. 81–84.

*Primary Examiner*—Kevin A. Kreiss
*Attorney, Agent, or Firm*—Fleisler, Dubb, Meyer & Lovejoy

[57] ABSTRACT

A transfer utility 18 provides for the transfer of data from a host computer 20 to the ROM socket 30 of a microprocessor based target system 28. The transfer occurs through an interface board 26 which includes a ROM socket 42 for mounting an option optional ROM 44.

15 Claims, 15 Drawing Sheets

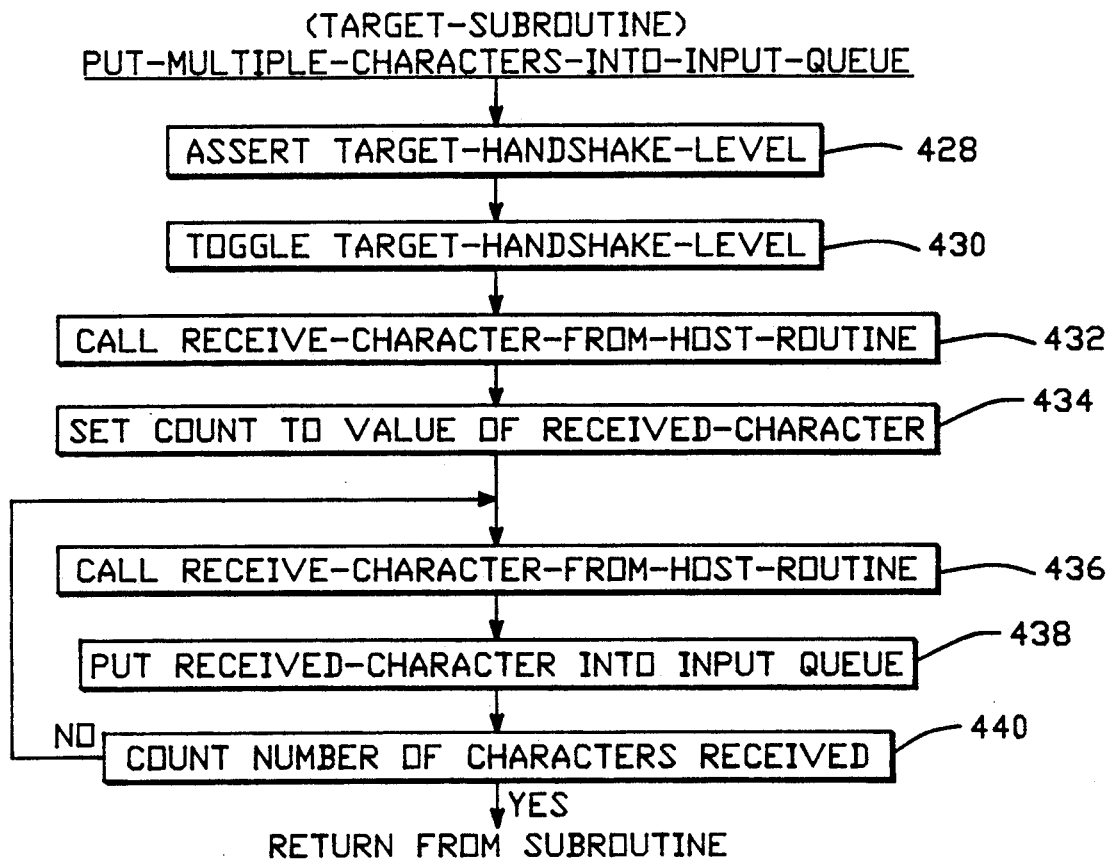
FIG.—13a
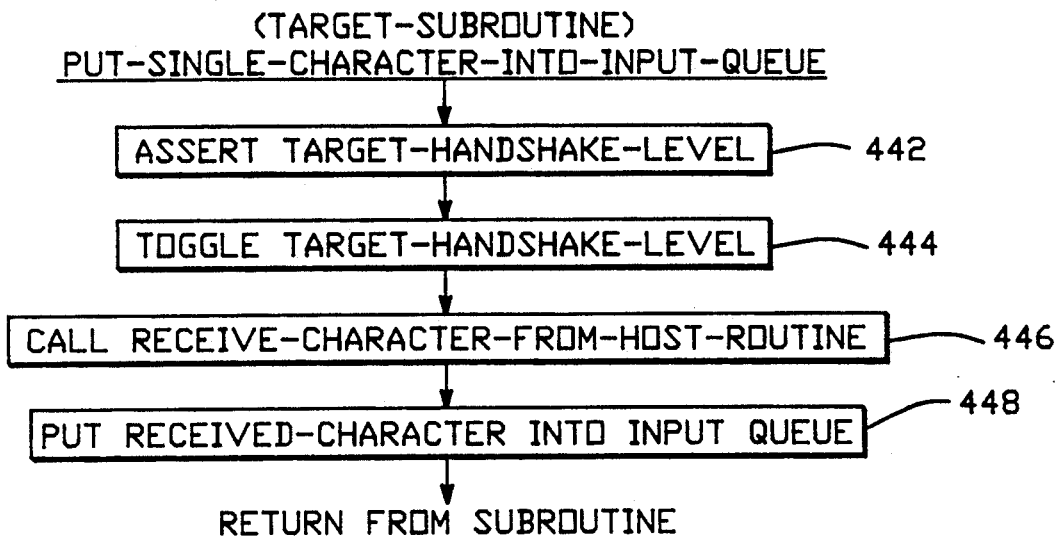
FIG.—13b

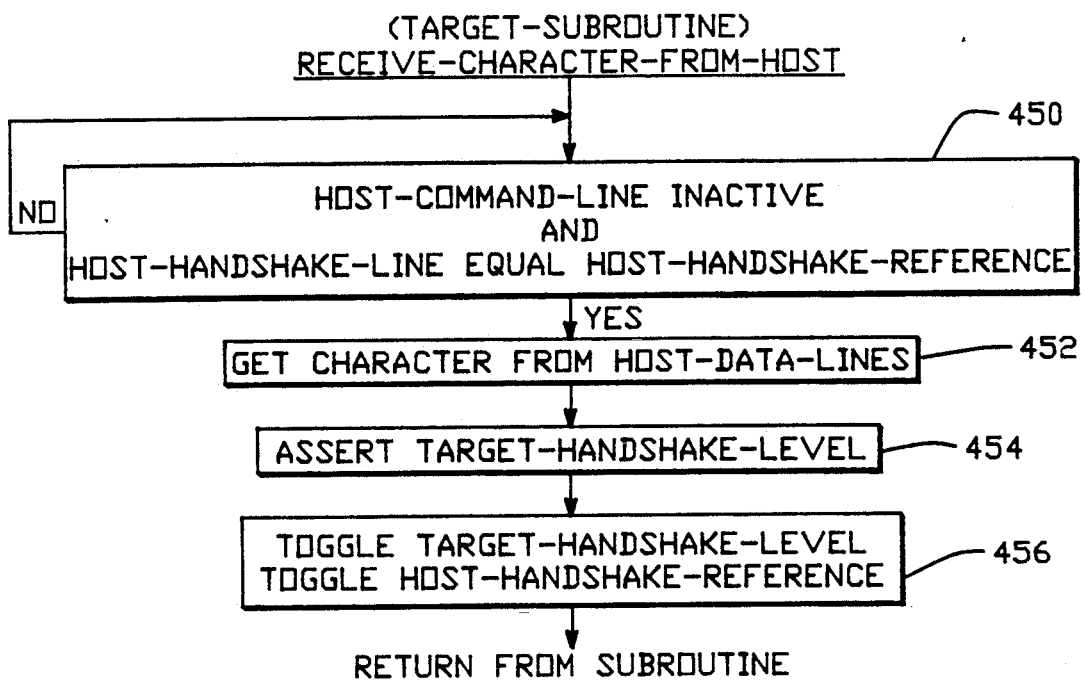
FIG.—14a
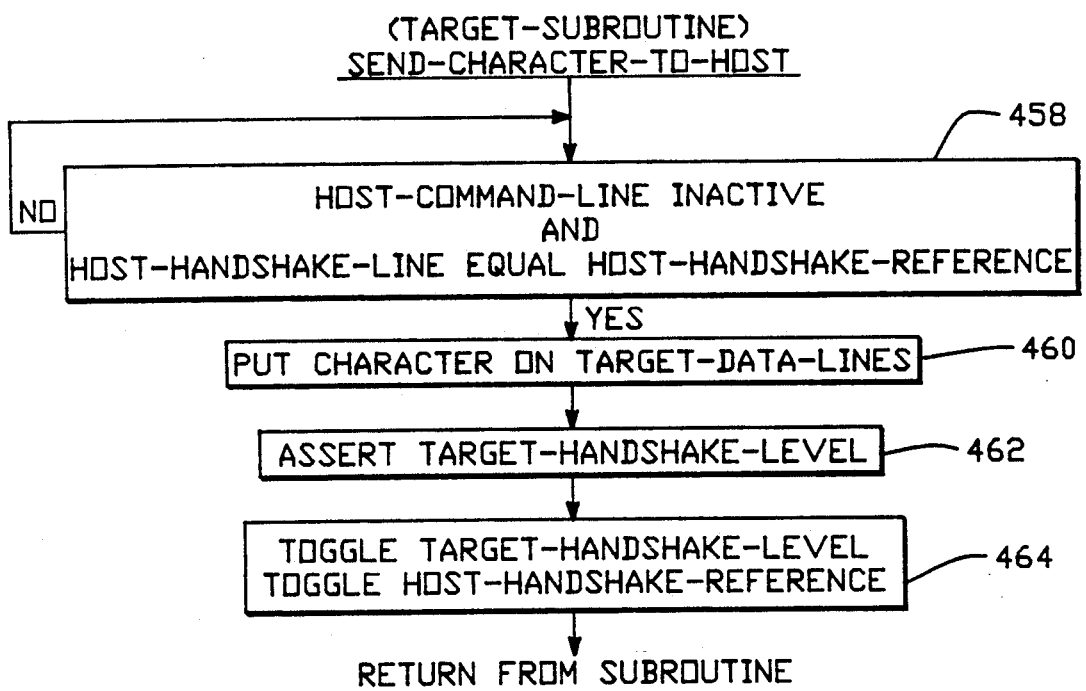
FIG.—14b

ROM SOCKET COMMUNICATION DEVICE FOR DATA TRANSFER BEWEEN A HOST COMPUTER AND A MICROPROCESSOR BASED SYSTEM

CROSS-REFERENCE TO RELATED APPLICATION

The present application is a continuation-in-part of U.S. patent application entitled "PARALLEL TRANSFER UTILITY FOR DATA TRANSFER BETWEEN A HOST COMPUTER AND A MICROPROCESSOR BASED SYSTEM", filed on Aug. 5, 1987, Ser. No. 07/081,908 now abandoned.

FIELD OF THE INVENTION

The present invention relates to a data transfer utility and in a particular data transfer utility for transferring data between a host computer and a microprocessor based target system.

BACKGROUND OF THE INVENTION

Microprocessors are being designed into an increasing number of products every day. During the development of these microprocessor based products, the software controlling the microprocessor must be loaded into the product and debugged. Very often, the product being developed includes neither a parallel nor serial device suitable for communicating with a host computer. Communication with the host computer is necessary to download the microprocessor program into the product and to also debug both the product's hardware and software. Almost all microprocessor based systems (except those systems that have all the memory on the same chip as the microprocessor) do include ROM (Read Only Memory) and/or SRAM (Static Random Access Memory) devices.

Every one of the products that include a microprocessor must also include software for the microprocessor. Usually the software is developed in a host computer such as for example, a Digital Equipment VAX minicomputer or an IMB PC and transferred to the microprocessor based target product for testing. The number of software transfers that must take place during the development of a product can be in the tens of thousands.

Typically, for example, Motorola S Records, Intel Hex Records and transfer formats devised by other manufacturers are used to transfer the software from the host computer to the microprocessor based product. All of those popular transfer formats involve converting the data into characters that can be transmitted over a standard RS-232 Serial line. The characters are then converted back into their original form in a receiver at the other end of the line. Such transfer techniques are used almost universally because RS-232 serial ports (the ports by which most terminals talk to computers) are found on almost all computers.

RS-232 based transfer utilities have one major drawback. These utilities are very slow. Using the Motorola S Records utility and a 9600 Baud RS-232 serial line, data can be transferred at the rate of 300 bytes per second. At that rate a 100,000 byte program would take about 5½ minutes to transfer. If such a program had to be loaded 10,000 times during the development of a product, over 900 hours would have been spent waiting for data transfers to complete.

SUMMARY OF THE INVENTION

The present invention is directed to overcoming the disadvantages of the prior art.

The ROM Socket Communication Device being described herein allows a host computer to communicate with a microprocessor based product (the target system) through the almost always available ROM or SRAM socket. Furthermore, the ROM Socket Communication Device can share the memory socket with the ROM or SRAM that it had to displace. Host-Target communications can be taking place through the ROM Socket Communication Device at the same time instructions are being executed out of the memory device piggy-backed onto the ROM Socket Communication Device. Being able to simultaneously share (on different bus cycles) a socket with a memory device is important, since many microprocessor based products do not have space memory sockets.

The ROM Socket Communication Device, including the communication software routines running on both the host and microprocessor based target systems, allows asynchronous processes on both the host and target systems to communicate with each other Without a dedicated I/0 port nor the assistance of interrupts.

The invention is a communication device that can be used to transfer data between any host computer and any microprocessor based target product with a ROM (read only memory) or SRAM socket. Data transfer rates of 50,000 bytes per seconds are easily reached when transferring between an IBM PC/AT and a 68020 microprocessor based product. Using the transfer utility, the 900 hour figure computed for doing an RS-232 serial transfer is reduced to 5½ hours. The present invention uses two devices, a printer port or other I/O device and a ROM socket for purposes other than what they were designed for.

The invention also includes the method of transferring data between a host computer and a microprocessor based system.

Thus, it is an object of the present invention to provide for a communication device for transferring data between a host computer and a microprocessor based system.

It is a further object of the present invention to transfer data between a host computer and a memory socket of a microprocessor based system.

It is a further object of the present invention to provide a controller for facilitating the transfer of data between the host computer and the microprocessor based system.

It is yet another object of the present invention to provide an optional ROM socket in substitution for the ROM socket selected by the present invention for data transfer.

It is still another object of the present invention to provide for selective enabling of the optional ROM socket when data transfer between the host computer and the microprocessor based system is not desired.

BRIEF DESCRIPTION OF THE FIGURES

FIGS. 6 to 15 depict schematical block diagrams of the embodiment of the invention of FIG. 5.

DETAILED DESCRIPTION OF THE PREFERRED EMBODIMENTS

First Embodiment

Figure 1:
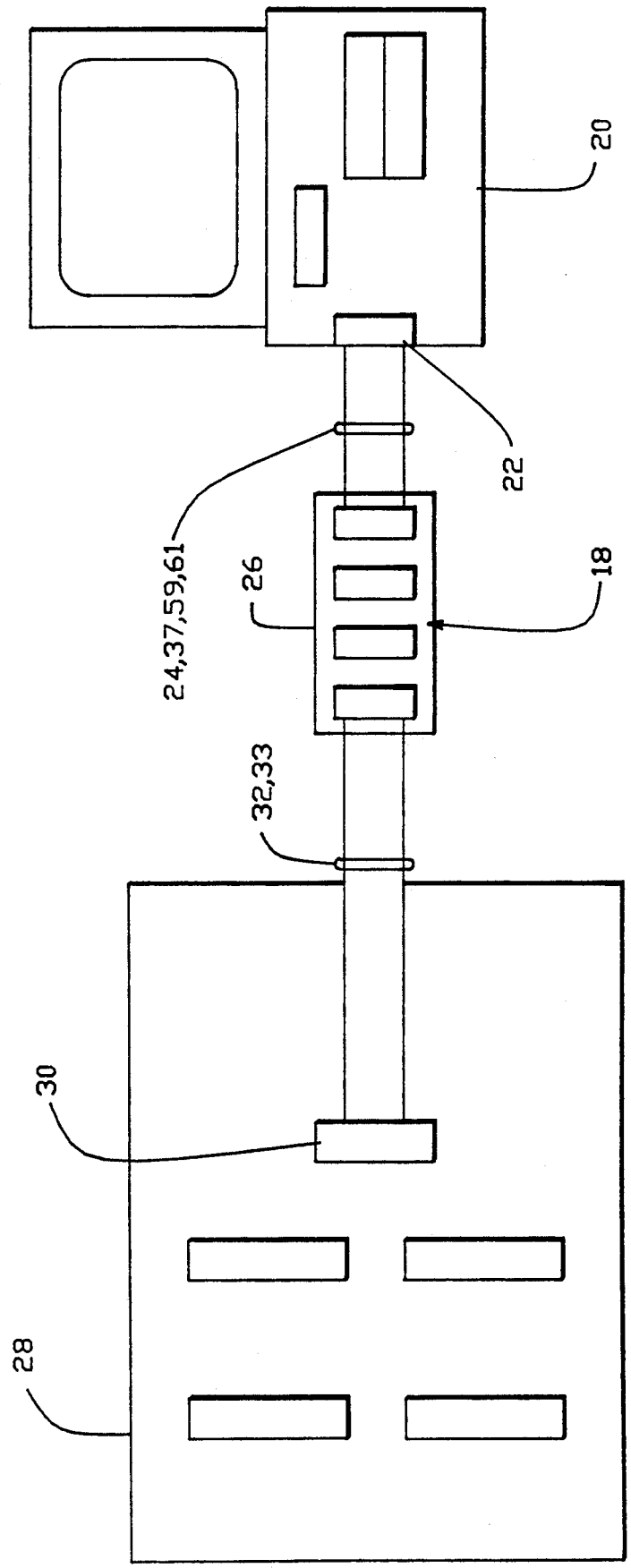
FIG. 1 is a depiction of a first embodiment of the present invention which includes a host computer with a parallel printer port, an interface board and a microprocessor based target system.

With reference to the figures and in particular to FIG. 1, a host computer 20 with a parallel printer port 22 is connected by appropriate cabling 24, 37, 59, 61 to an interface board 26 with a transfer utility 18. A microprocessor based target system 28 to which data from the host computer 20 is to be downloaded, includes a read only memory (ROM) socket 30 which is communicated with appropriate cabling 32, 33 to the interface board 26.

Figure 2:
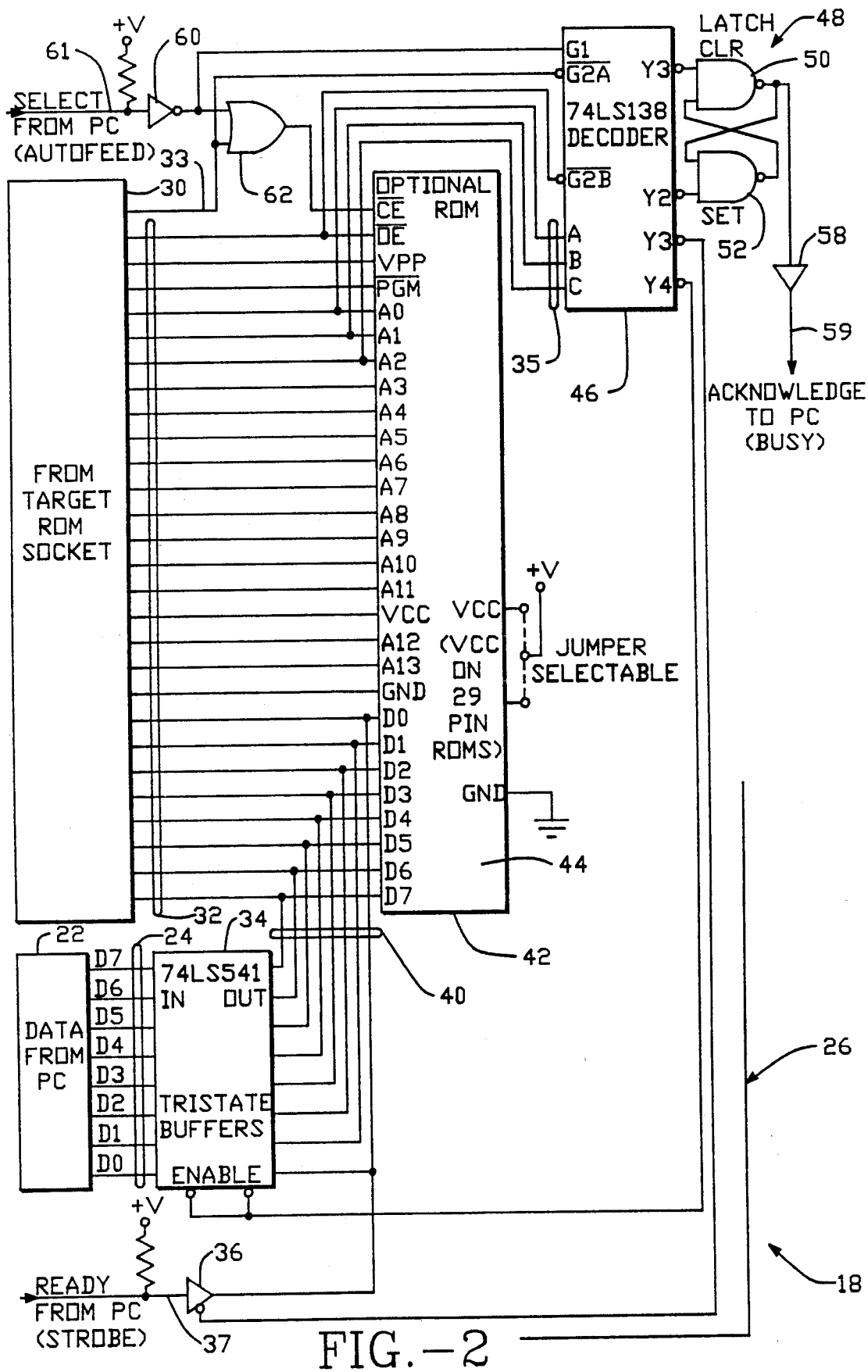
FIG. 2 is a schematic of an embodiment of an interface board of FIG. 1 of the present invention.
Figure 3:
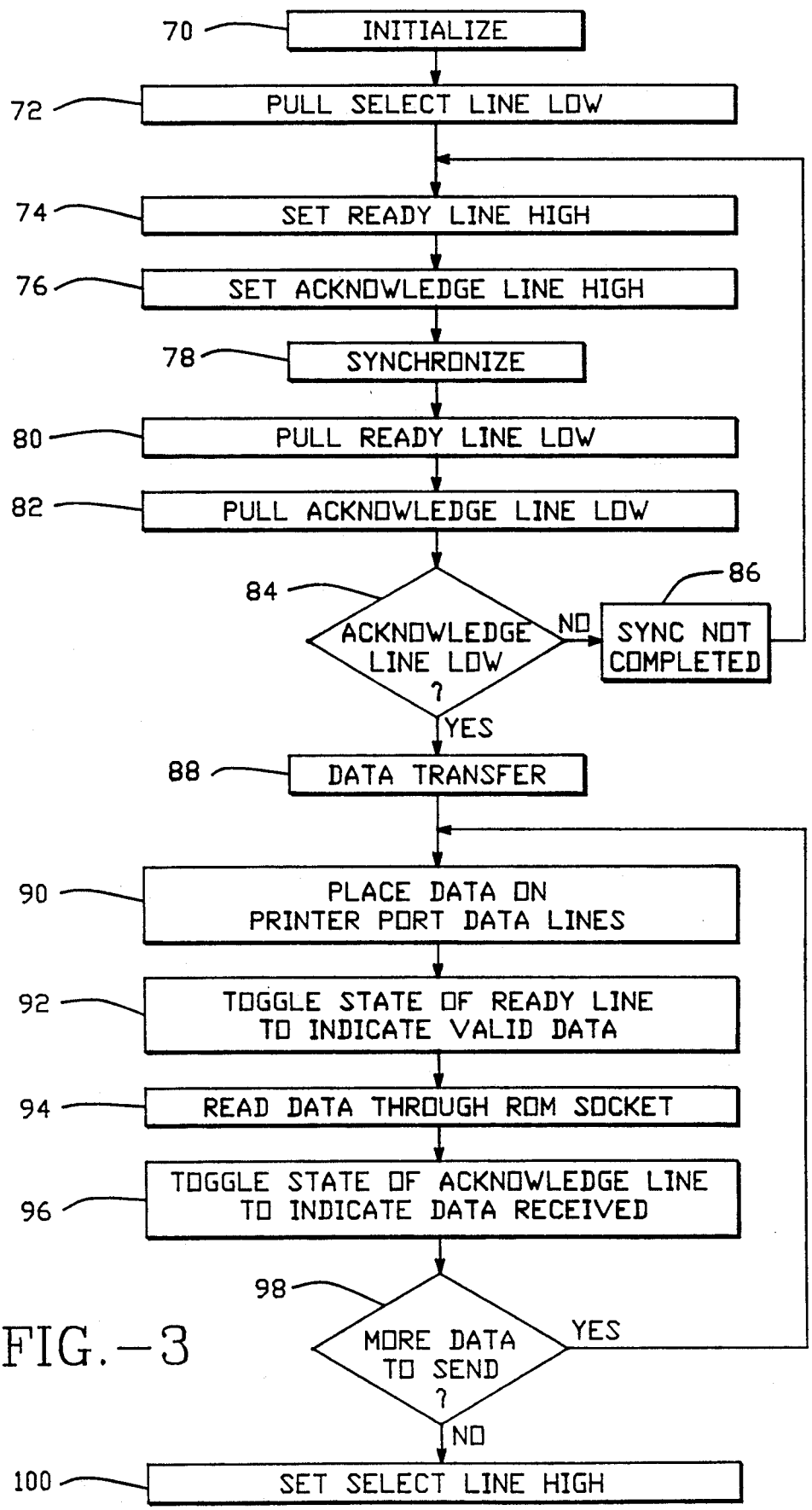
FIG. 3 depicts a schematical block diagram of the embodiment of the invention.
Figure 4:
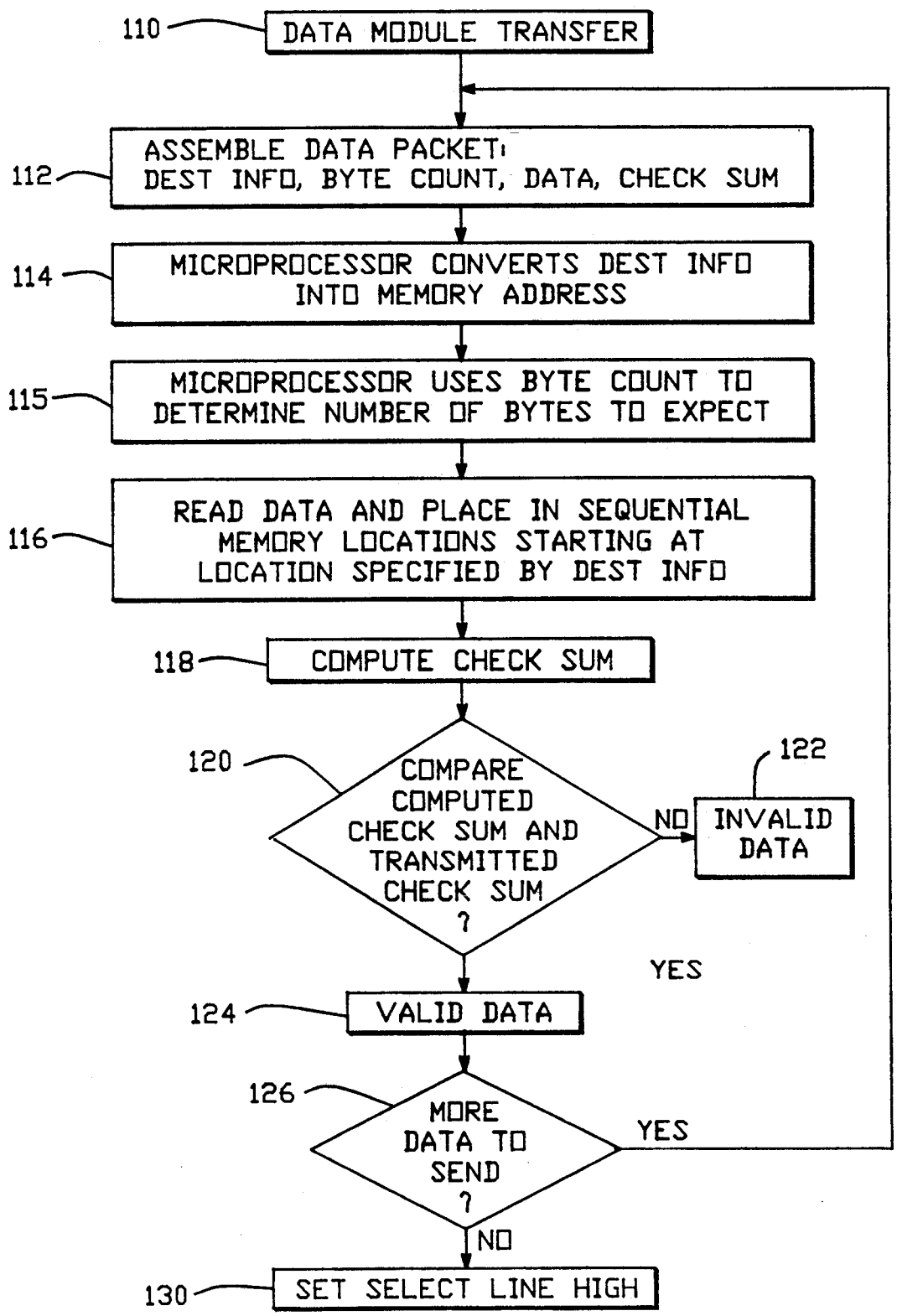
FIG. 4 depicts a further schematical block diagram of the embodiment of the invention.
Figure 5:
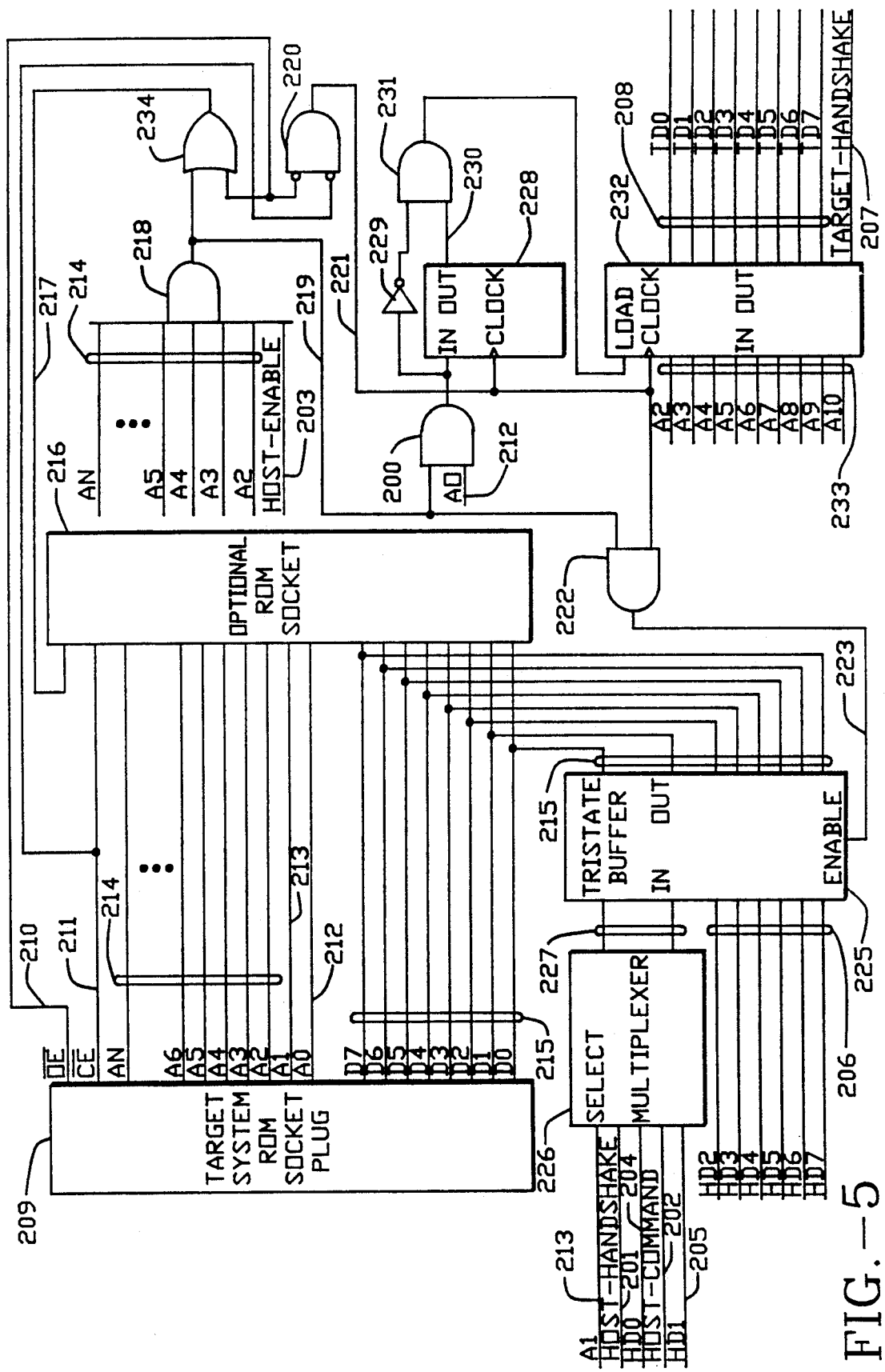
FIG. 5 is a schematic of a second embodiment of an interface board for the present invention.
Figure 6:
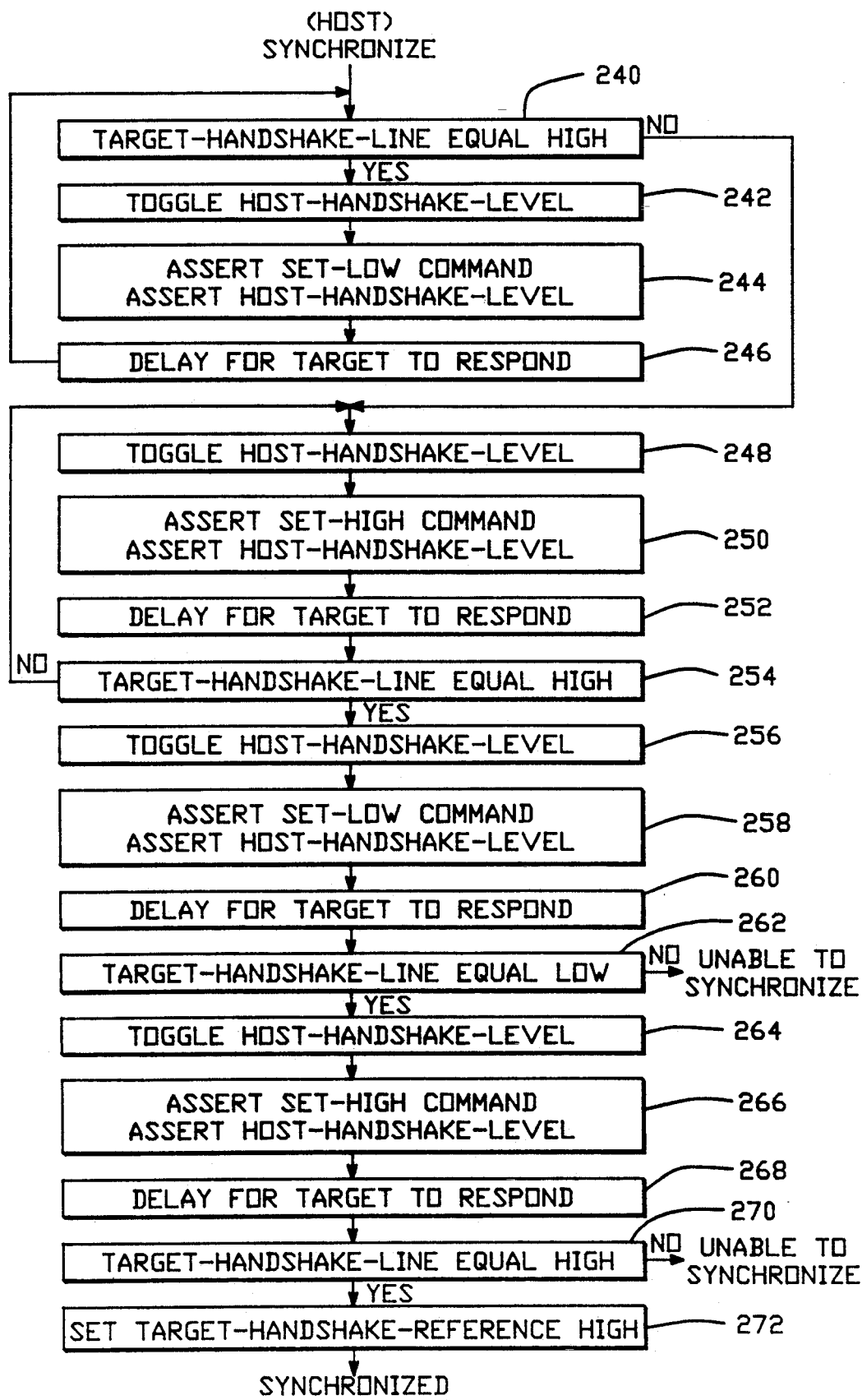
Figure 7:
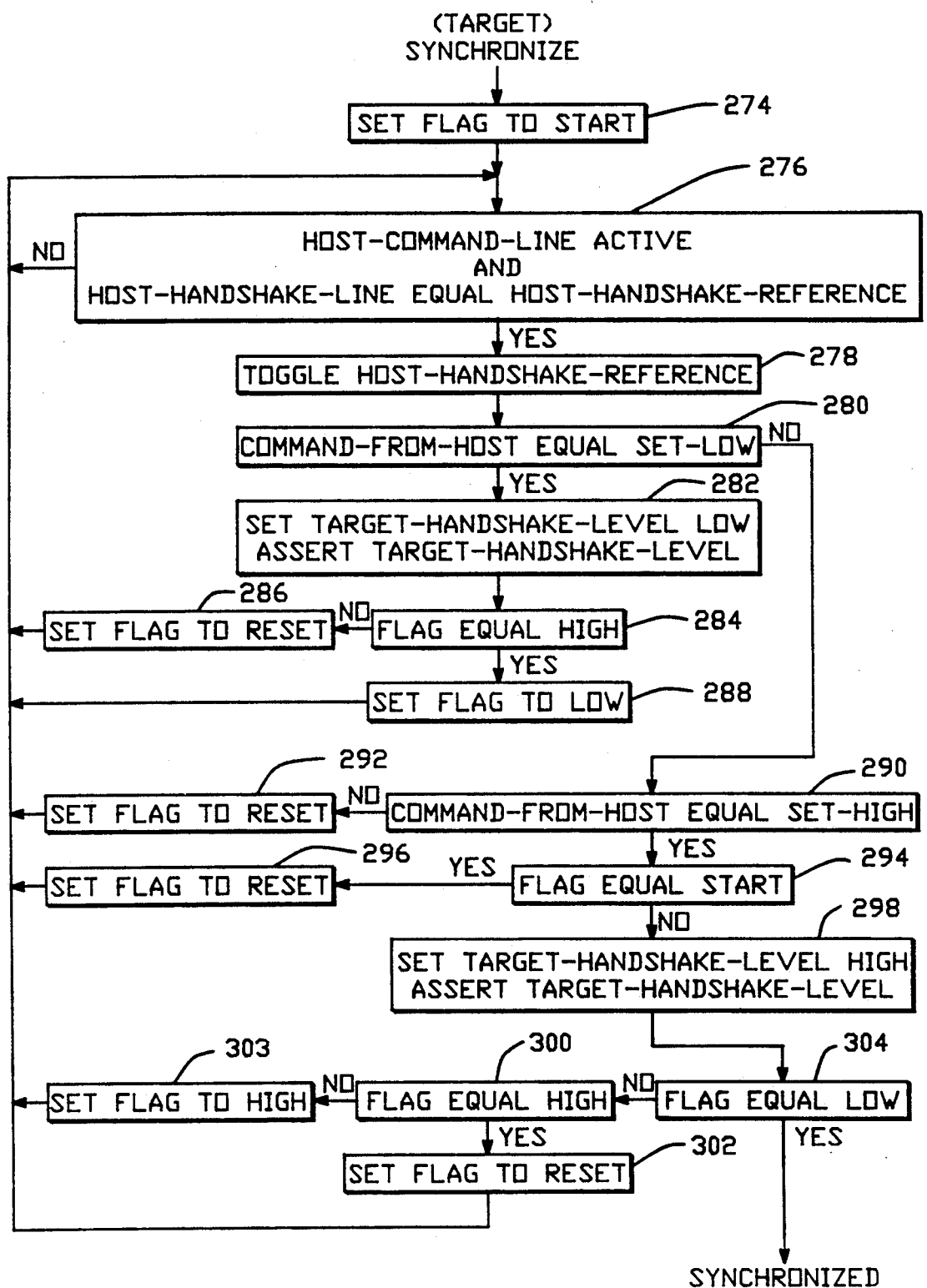
Figure 8:
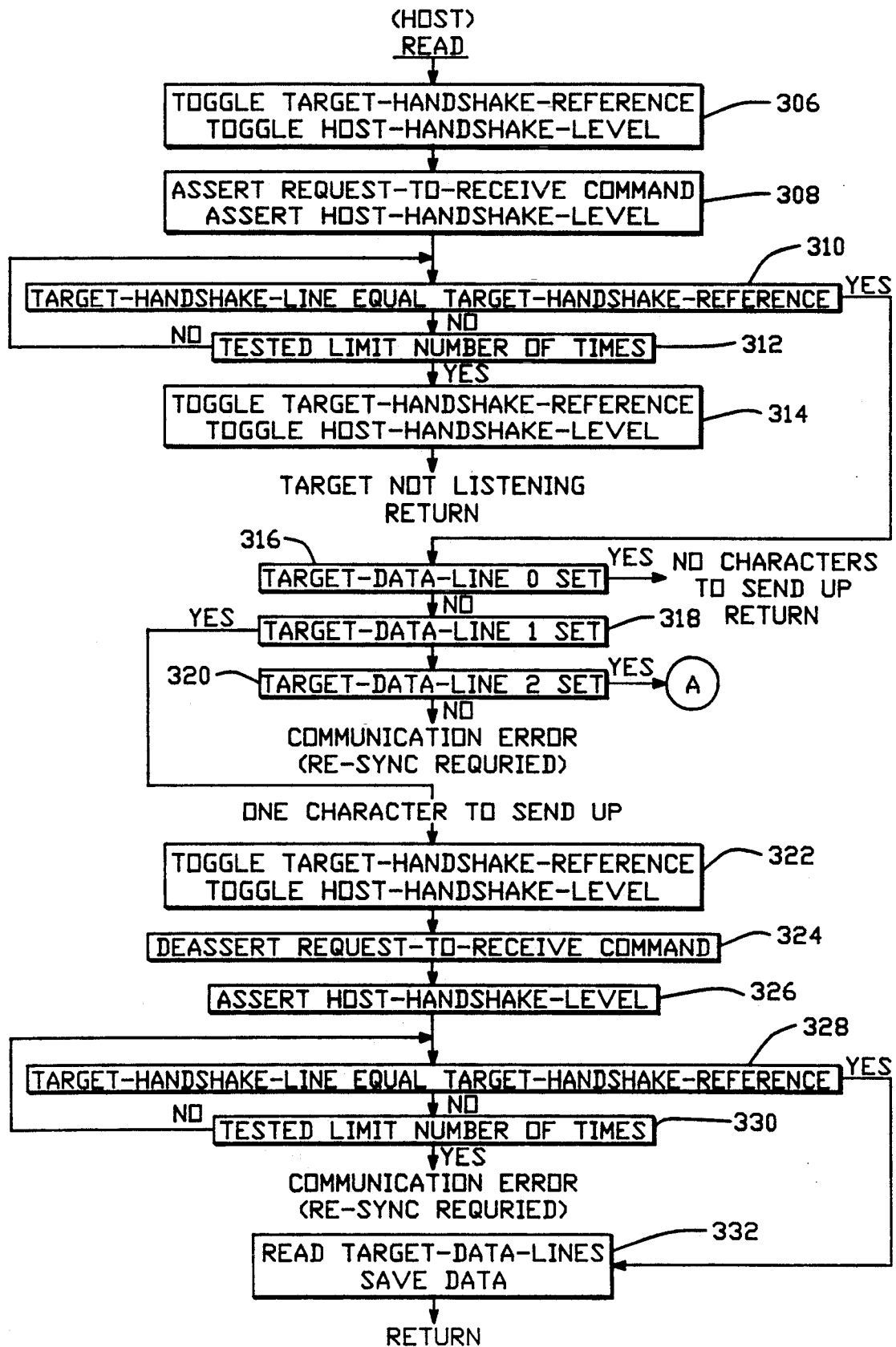
Figure 9:
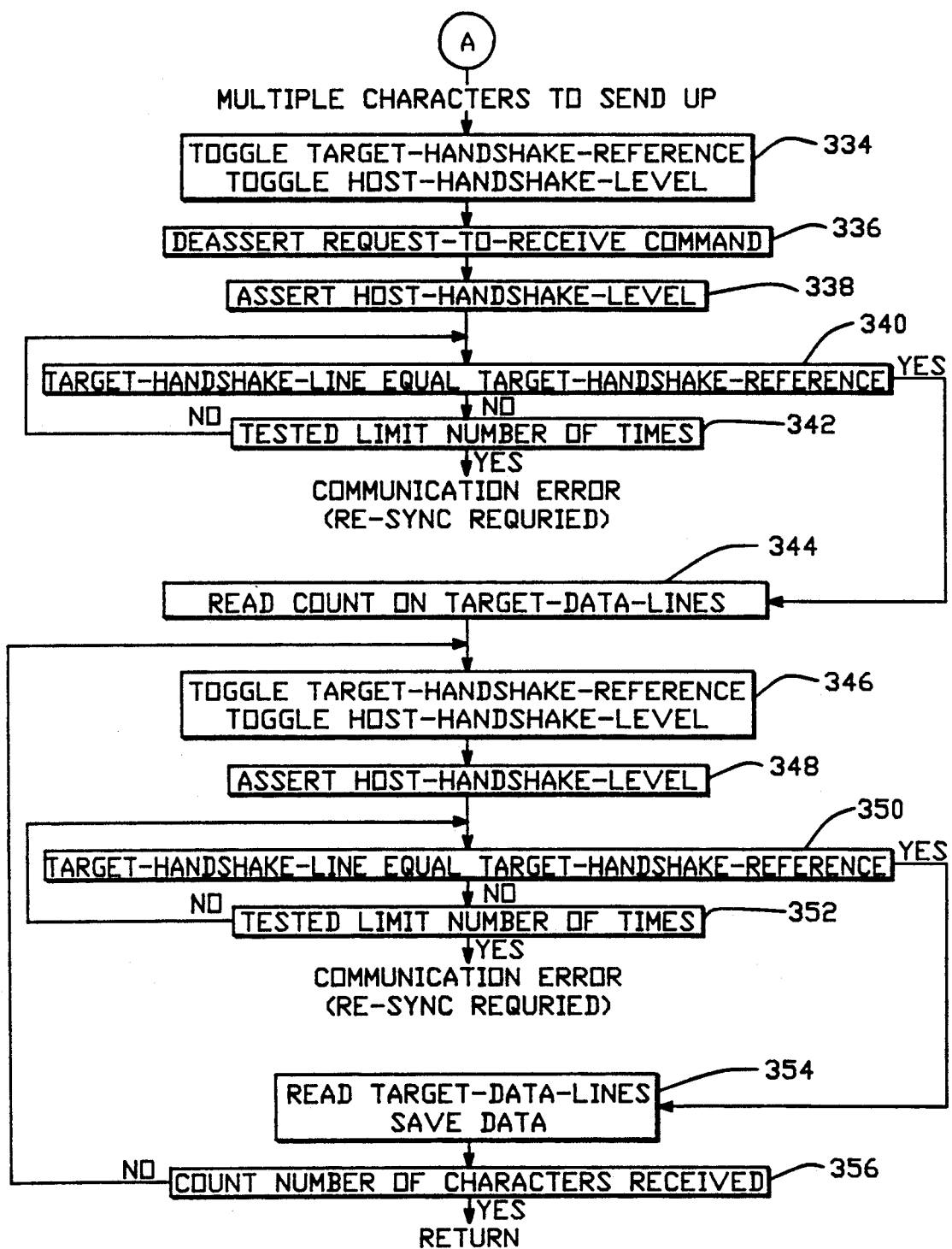
Figure 10:
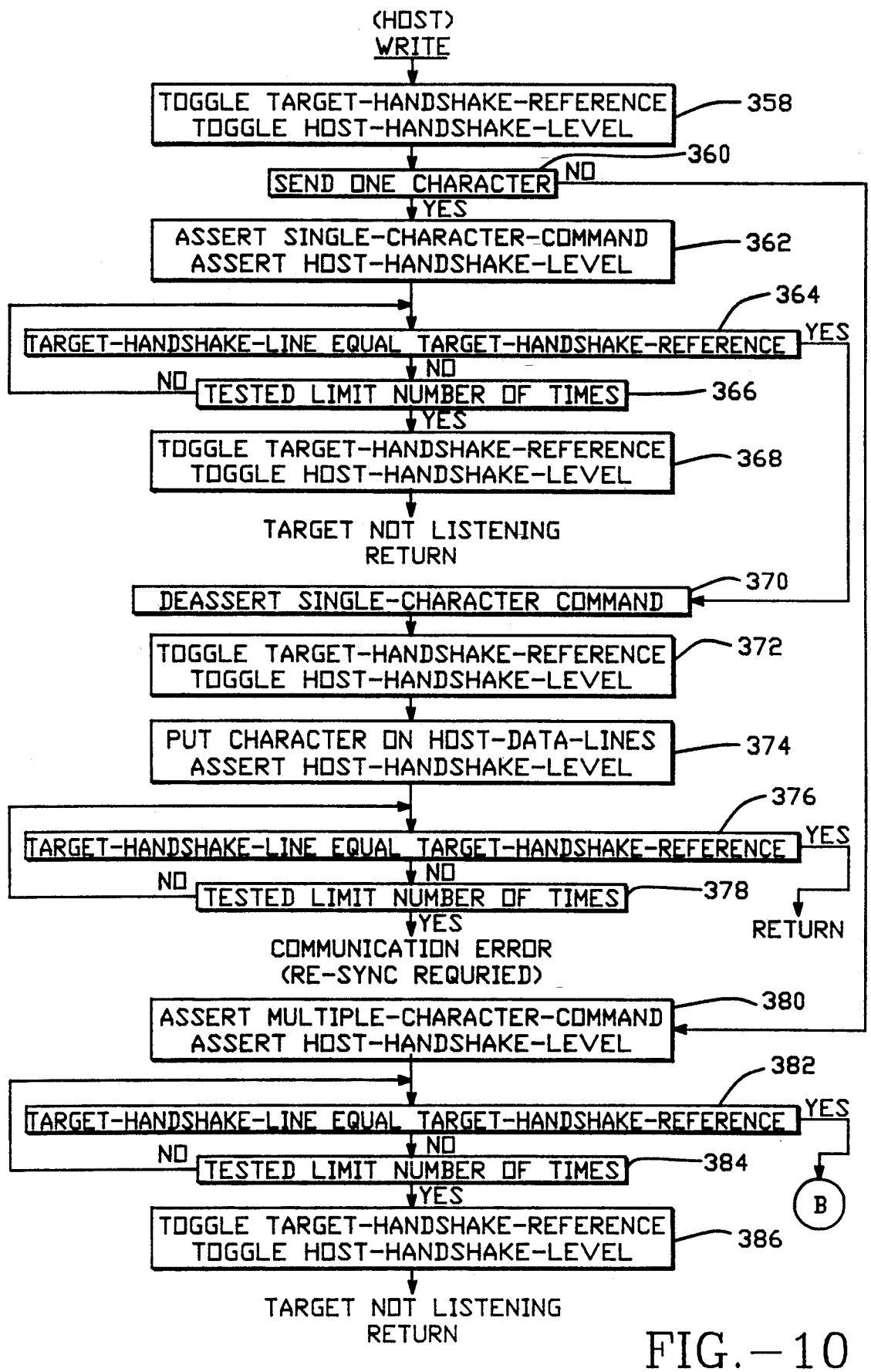
Figure 11:
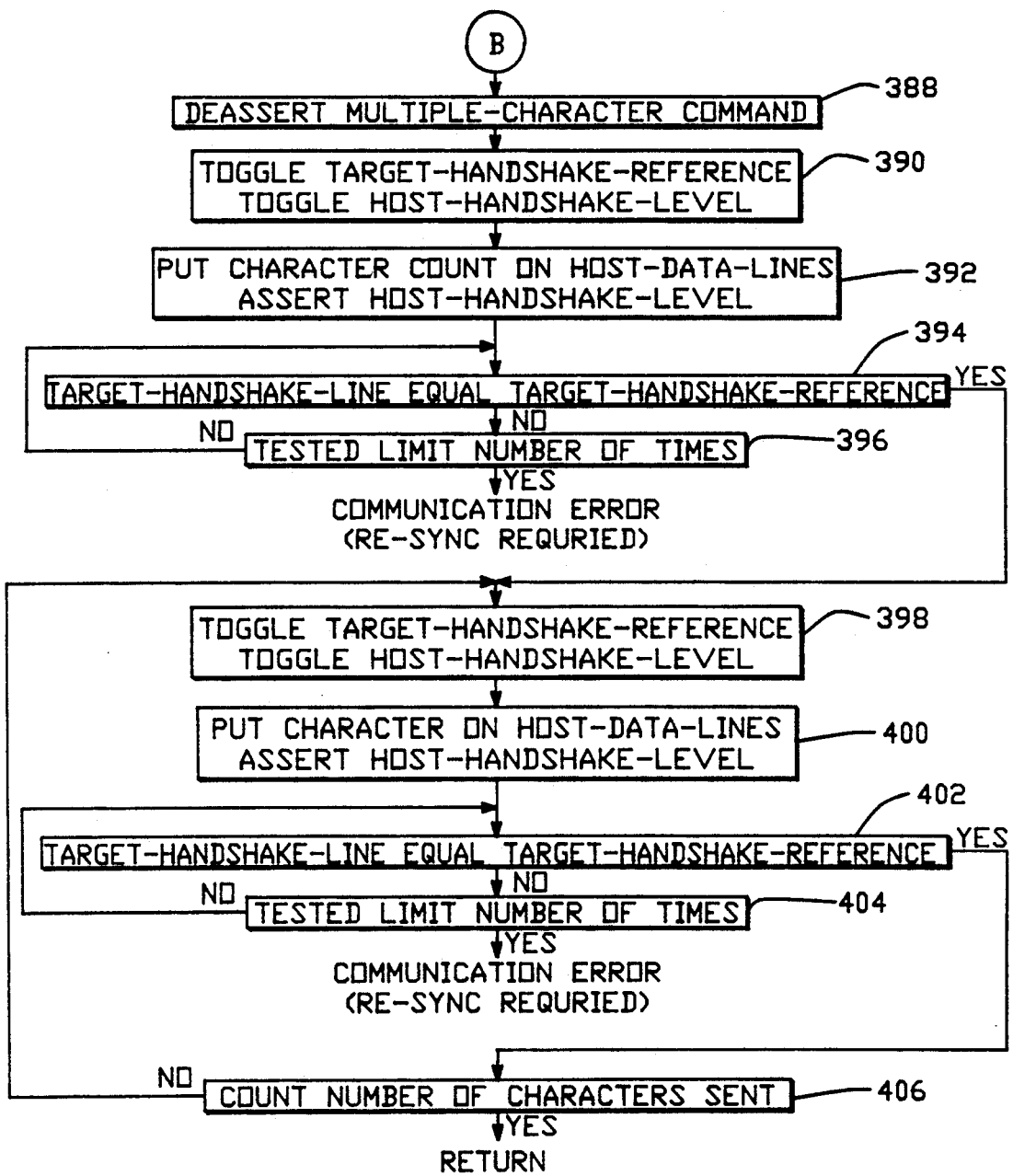
Figure 12:
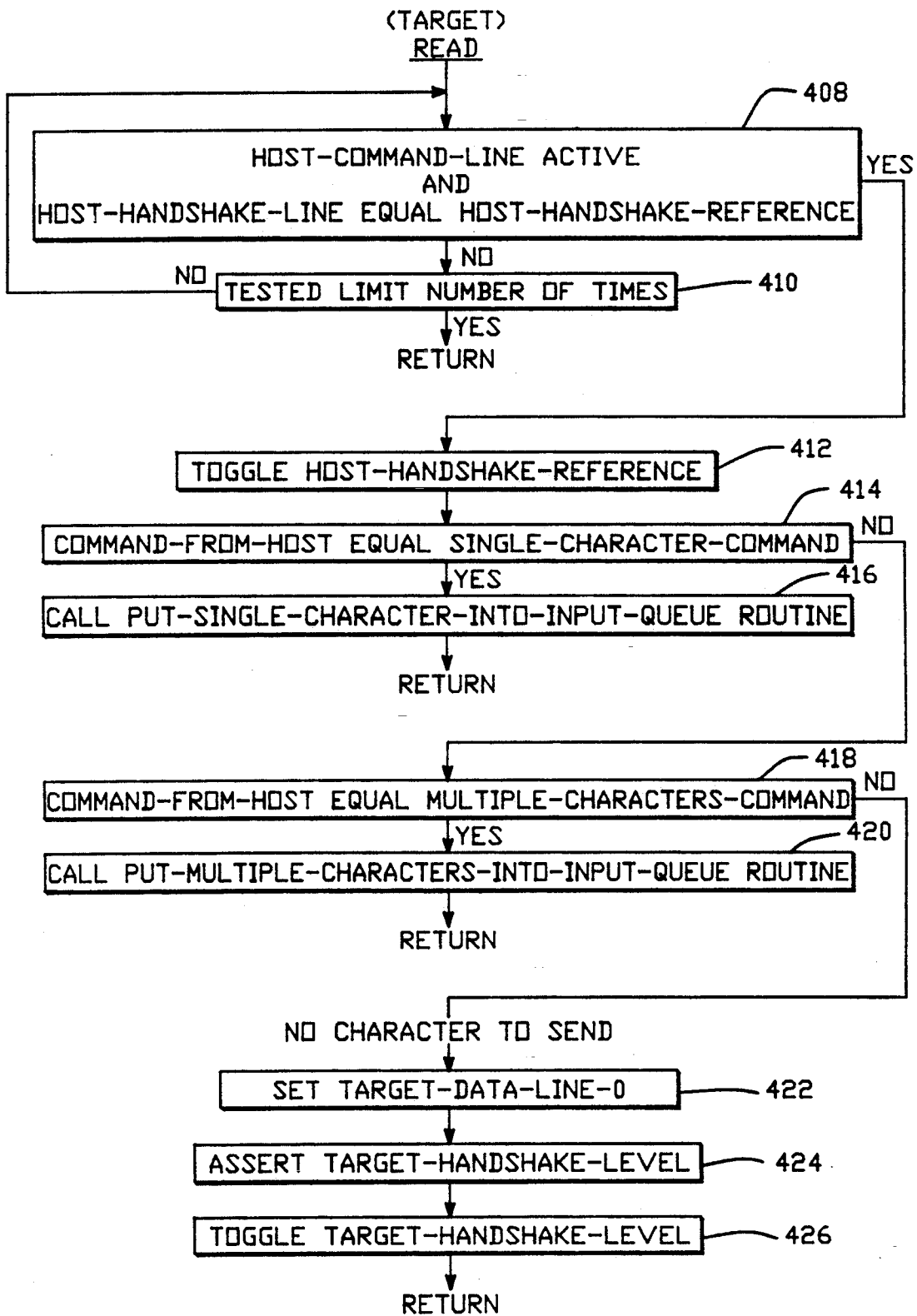
Figure 15:
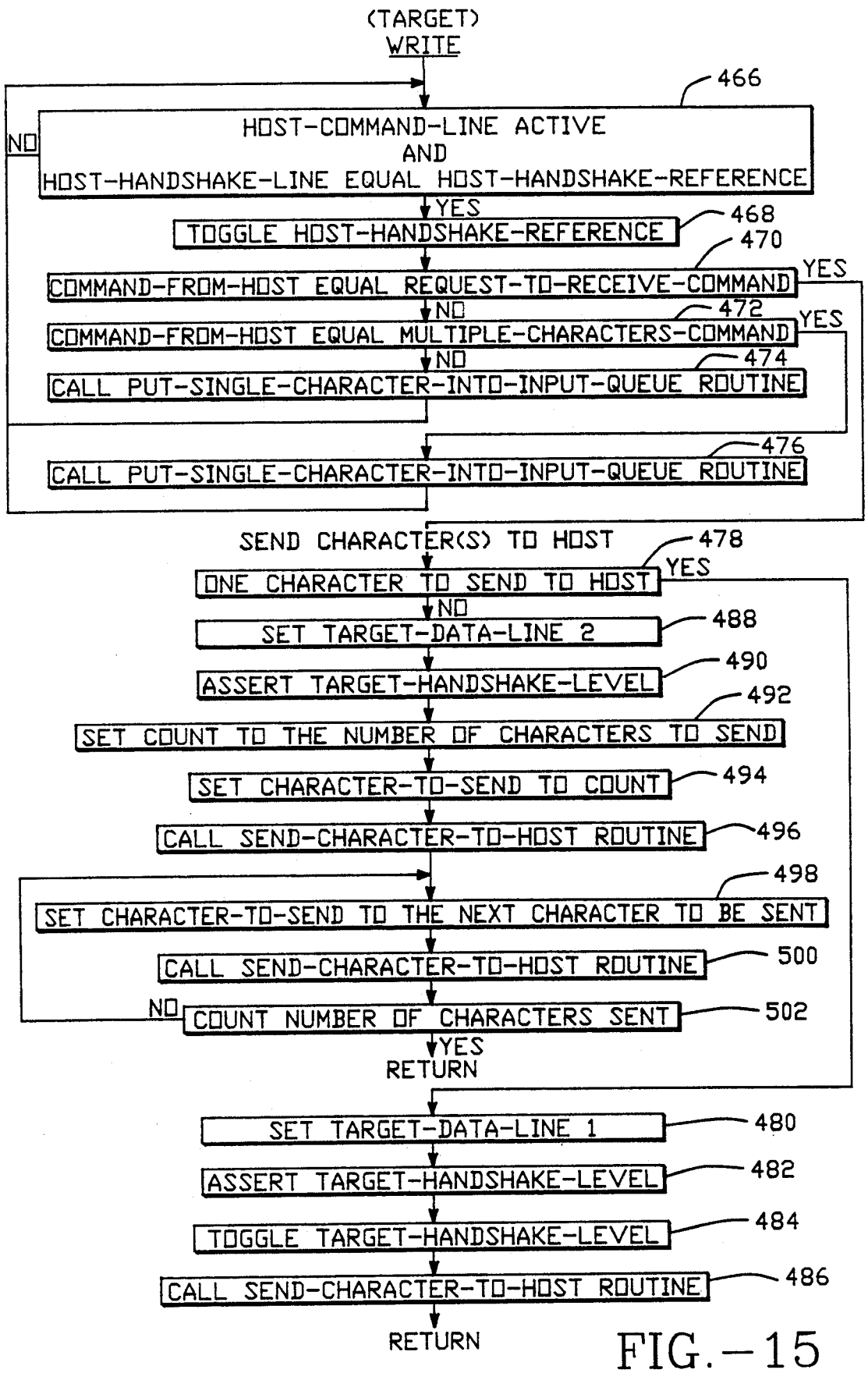

In FIG. 2, the interface board 26 and transfer utility 18 are shown in greater detail. The cabling of FIG. 1 is shown in FIG. 2 and given corresponding reference numbers 24 and 32, respectively. This cabling allows for the transfer of data in a parallel mode. As can be seen in FIG. 2, the utility 18 on the interface board 26 includes tri-state buffer 34 which communicates with the data lines D0 to D7 of cabling 24 from the host computer. An in-line tri-state buffer 36 communicates the READY line 37 of a host computer to the D0 data line on the output side of the tri-state buffer 34 which connects to trace 40, cabling 32 and ROM socket 30. It is to be understood that in a host computer which includes for example, an IBM PC/AT, that the READY line 37 is commonly known as a Strobe line which is found on pin 1 of the printer port of the IBM PC. As can be seen in FIG. 2, appropriate traces 40 are provided for communicating the tri-state buffer 34 with the ROM socket 30 through cabling 32.

Also provided on the interface board 26 is an optional ROM socket 42 which can receive a ROM 44. The ROM socket 42 communicates with the cabling 32 as indicated. The ROM socket 42 takes the place of the ROM socket which is in the microprocessor based target system 28 and which is presently being used by the cabling 32.

The transfer utility 18 on interface board 26 further includes a decoder 46 and a latch 48 (flip-flop) with clear and set NAND gates 50, 52. As can be seen in FIG. 2, the latch 48 is connected to the decoder 46 at decoder data outputs Y3 and Y2. The latch 48 is in turn communicated through a buffer 58 to the ACKNOWLEDGE line 59 of the host computer 20. It is to be understood that the host computer is an IBM PC/AT that the ACKNOWLEDGE line 59 is commonly known as the BUSY line which is located at pin 11 of the printed port.

The data lines D0-D7 for a host computer 20 which include an IBM PC/AT are found on pines 2-9 of the printer port.

As can be seen in FIG. 2, the data output line Y4 communicates with the enable pins of the tri-state buffer 34 and the data output line Y3 communicates with enable pin of the tri-state buffer 36. Further as can be seen in FIG. 2, the select inputs A, B and C communicate with the ROM socket 30 through cabling 32 and 35, with the output enable, OE, line of the cabling 32 and ROM socket 30 communicating with the enable input $\overline{G2B}$ of decoder 46.

The enable input $\overline{G2A}$ communicates with ROM socket 30 of the microprocessor based target system 28 through line 22 of cabling 32.

Finally the SELECT line 61 from the host computer is communicated to the enable input G1 of the decoder 46 through an inverter 60. The SELECT line 61 and line 33 further communicate with the chip select, $\overline{CE}$ of the ROM 44, through OR gates 62. It is to be understood that for an IBM PC/AT that the SELECT line 61 is commonly known as the AUTO FEED line which is pin 14 of the PC printer port.

Physically, the interface board 26 is positioned less than a foot from the ROM socket 30 and up to 20 feet from the host computer 20. The ROM socket 30 cannot drive long lines and the time to access the data is on the order of 100 nanoseconds, thus the short distance between the ROM socket 30 and the interface board 26.

The data transfer utility 18 in FIG. 2 is controlled by reading from specified addresses of the ROM socket 30. Normally, different ROM socket addresses correspond to different locations in the ROM inserted in ROM socket 30. When the ROM socket 30 is used to receive data from the host computer 20, the ROM socket addresses are decoded by the data transfer utility 18 on the interface board 26. The decoded addressees cause a latch 48 to be set or cleared (ACKNOWLEDGE signal to the host computer 20). The decoded addresses also enable either the data from the host computer 20 or the READY line 37 from the host computer 20 to be read from the ROM socket.

Due to the fact that there may be no available ROM sockets on the microprocessor target system 28, ROM socket 42 was included on the interface board 26. Socket 42 can accept a ROM that would have normally been plugged into the ROM socket 30 of the microprocessor target system 28 now used by the cabling 32. When data transfers between the host computer 20 and the microprocessor based system 28 are not taking place, the data transfer utility 18 is disabled and the ROM 44 plugged into the ROM socket 42 on interface board 26 is electrically connected to appear as if it were plugged directly into the ROM socket 30. As indicated above, the SELECT line 61 from the host computer 20 selects between the ROM 44 on interface board 26 and the data transfer utility 18 on board 26.

Software Operation

The operation of the transfer utility 18 of the invention is as follows.

INITIALIZE HOST 20 AND MICROPROCESSOR BASED SYSTEM 28 (BLOCK 70):

The SELECT line 61 from the host computer 20 is initially in the high state (power up state of the host 20). The host 20 then pulls the SELECT line 61 low (Block 72) to disable the optional ROM 44 and enable the data transfer utility 18, and sets the READY line 37 high (Block 74).

The microprocessor system 28 sets the ACKNOWLEDGE line 59 high (Block 76). Because software for the host 20 and microprocessor system 28 are running asynchronously, the ACKNOWLEDGE line 59 may have always been high or go high before or after the host 20 starts looking for the ACKNOWLEDGE line 59 to go high.

SYNCHRONIZE HOST 20 AND MICROPROCESSOR SYSTEM 28 (BLOCK 78):

The host 20 waits for the ACKNOWLEDGE line 59 from the microprocessor system 28 to go high.

Seeing the ACKNOWLEDGE line 59 from the microprocessor system 28 in the high state the host 20 pulls the READY line 37 to the low state (Block 80).

Seeing the READY line 37 from the host 20 in a low state, the microprocessor system 28 pulls the ACKNOWLEDGE line 59 low (Block 82). Both the host 20 and the microprocessor system 28 are synchronized at this point and ready to begin transferring data.

If the ACKNOWLEDGE line 59 did not go low in response to the READY line 37 going low (Blocks 84, 86), host 20 sets the READY line 37 high again. After a short delay, the synchronization process is begun over again beginning with waiting for the ACKNOWLEDGE line 59 to go high.

TRANSFERRING DATA (BLOCK 88):

After synchronization and before the first byte of data is transferred, both the READY and ACKNOWLEDGE lines 37, 59 are in their low states.

The host 20 places the byte of data to be transferred onto the printer port data lines D0-D7 (Block 90).

The host 20 then toggles the state of the READ line 37 to indicate that the data on the lines D0-D7 to the interface board 26 is valid (Block 92).

After sensing the READY line 27 change states, the microprocessor system 28 reads, through the ROM socket 30, the valid data from the host 20 that has had sufficient time to stabilize on the interface board (Block 94).

After reading the data, the microprocessor system 28 toggles the state of the ACKNOWLEDGE line 59 to inform the host 20 that the data has been received (Block 96). The cycle can now be repeated to transfer another byte of data (Block 98). After data transfer is completed, the SELECT line 61 is set high (Block 100).

TRANSFERRING A MODULE (BLOCK 110):

Transferring a module of data involves transferring a number of bytes of data to a specified location in the microprocessor system 28. In a preferred implementation, modules are transferred using data packets. A data packet contains destination information, a byte count, the actual data and a check sum (Block 112). Typically, both the destination address and the byte count will be four bytes long and the check sum will be one byte long.

Given the above description of a data packet, the microprocessor system 28 reads the first four bytes and pieces these bytes together to form an address that points into the microprocessor system 28 memory (Block 114).

The next four bytes are read and pieced together telling the microprocessor system 28 how many bytes of data to expect (Block 115).

The microprocessor system 28 next reads the expected number of bytes of data, placing the data into sequential memory locations starting at the location specified by the first four bytes of the packet (Block 116).

The byte following the expected number of data bytes is the packet check sum that was computed on the host 20. The host 20 computes a check sum based on the transmitted data and the target system computes a check sum based on the received data (Block 118). If the check sum byte computed by microprocessor system 28 does not match the check sum byte computed by the microprocessor system 28, an error is reported (Blocks 120, 122, 124). The process then repeats until all packets are transferred (Block 126).

After sending the check sum on the last data packet, the host 20 returns the SELECT line to the high state to re-enable the optional ROM 40 (Block 130).

SECOND EMBODIMENT:

The ROM Socket Communication Device, when it shares a socket with a SRAM or ROM (SRAM or ROM hereafter referred to as ROM), permits the entire ROM to be accessed when the ROM Socket Communication Device is not enabled and permits all but the top four address locations in the ROM to be accessed when the ROM Socket Communication Device is enabled for communications. Actually, only the top three locations are required but the top four locations (a power of 2) are reserved for simplicity. The loss of the top four ROM locations is insignificant given that todays ROM's include up to a million addressable locations. Typically, the only time the top four locations in a ROM must be accessed is during system power-up when a check sum might be performed.

For purposes of example, it will be assumed that the ROM socket used for communications will be configured to accept a 27512 ROM (64 K×8), a device with 65535 addressable locations. Using hexadecimal notation, the top four locations are FFFC through FFFF. When the ROM socket communication device is enabled, it operates as follows. A read from target system ROM location FFFC allows the eight data lines from the host computer to be read through the ROM socket's data lines. A read from location FFFE allows a host handshake line, a host command line, and six host data lines to be read through the ROM socket's data lines. A read from location FFFD sets a latch on the ROM Socket Communication Device such that the next time a read is performed from anywhere in the ROM address space, the levels on ROM address lines A2 through A10 are latched and made available to be read by the host system. Of the nine bits that are latched, eight are data and one is a target handshake line back to the host. Eight data bits and a handshake level are part of the ROM address referenced immediately after the reference to location FFFD. For purposes of example, eight data bits were included in the address, fewer than or more than eight bits could have also been used.

The hardware device described above cannot operate without specialized software running on both the host and target systems. Because the processes running on the host and target systems are asynchronous and interrupt requests cannot be issued through a ROM socket, the communication routine running on the host system operates as the master controlling both the sending and receiving of data to and from the target system.

Host-handshake-line 201, host-command-line 202, host-enable-line 203, and host-data-line HD0 204, HD1 205 and HD2 through HD7 206 as well as target-handshake-line 207 and target-data-lines TD0 through TD7 208 connect to a host system through any one of a number of possible devices such as a parallel printer port, a SCSI interface or an Ethernet interface.

A target system ROM socket plug 209 plugs into a ROM socket on a target system. Connected to a target system through plug 209 is an output enable $\overline{OE}$ 210, a chip enable $\overline{CE}$ 211, address lines A0 212, A1 213 and A2 through An 214 (where An is the highest order address line), and data lines D0 through D6 215. An optional ROM socket 216 connects chip enable $\overline{CE}$ 211, address lines A0 212, A1 213 and A2 through An 214, data lines D0 through D6 215, and a conditional output enabler signal 217 to a ROM that can effectively operate out of the same socket as the ROM socket communication device.

For purposes of explanation, it is assumed that the ROM socket the ROM Socket Communication Device is plugged into is configured for a 27512 (64 K×8) ROM. Assuming a 27515 ROM, address line An would be A15. When the communication device is enabled (host-enable-line 203 high), and ROM location FFFC is read (address lines A2 through A15 214 high); AND gate 218 drives line 219 high. During the read from location FFFC, the chip enable $\overline{CE}$ 211 and output $\overline{OE}$ 210 lines go active (low) after the address lines 214 are stable, allowing gate 220 to drive line 221 high. When both lines 219 and 221 are high, gate 222 drives line 223 high causing the output lines 224 on tri-state buffer 225 to go active. When reading from location FFFC address line A1 212 connected to multiplexer 226 allows host data lines HD0 204 and HD1 205 to pass through multiplexer 226 to lines 227 connected to tri-state buffer 225. The host data signals now split between lines 227 and 206 pass through the enabled tri-state buffer 225 to ROM socket data lines 215 connected to the data lines on a target system ROM socket through plug 209.

When ROM location FFFE is read, the output 215 of tri-state buffer 225 is enabled the same as with a read from ROM location FFFD. The difference is that ROM socket address line A1 213 connected to multiplexer 226 is high allowing host-handshake-line 201 and host-command-line 202 to pass through multiplexer 226 to lines 227 connected to tri-state buffer 225. Now the signals from host-handshake-line 201 and host-command-line 202 together with the signals from host data lines HD2 through HD7 206 pass through the enabled tri-state buffer 225 to ROM socket data lines 215 connected to the data lines on a target system ROM socket through plug 209.

When ROM location FFFD is read, line 219 driven by AND gate 218 is again high, and ROM socket address line A0 211 is high allowing AND gate 200 to drive the data input of latch 228 high as well as the input of inverter 229. When the output enable $\overline{OE}$ 210 and chip enable $\overline{CE}$ to active (low) causing gate 220 to drive line 221 high, the high level at the output of AND gate 200 is latched into latch 228 driving latch output line 230 high.

Now that the output of latch 228 connected to line 230 is high, a read from any ROM location other than location FFFD or FFFF will cause AND gate 231 connected to the LOAD input on latch 232 to go high. With the LOAD input to latch 232 high, the ROM address lines A2 through A10 233 (included in address lines 214) are latched into latch 232 when line 221 goes high as a result of output enable $\overline{OE}$ 210 and chip enable $\overline{CE}$ going active (low). The data levels present on ROM address lines A2 through A9 latched into latch 232 are now present on target data lines TD0 through TD7 208 respectively. The handshake level present on ROM address line A10 latched into latch 232 is no longer present on target-handshake-line 207.

The inverter 229 and AND gate 231 are needed to prevent latch 232 from accidently being loaded during a read from ROM location FFFD. Without inverter 229 and AND gate 231 the load input to latch 232 will be high during the read from ROM location FFFD after the chip enable $\overline{CE}$ 211 and output enable $\overline{OE}$ 210 lines go active (low). Electrical noise on the chip enable $\overline{CE}$ 211 and/or output enable $\overline{OE}$ 210 lines during a read from ROM location FFFD could be interpreted as a clock edge to latch 232 allowing the levels on ROM address lines A2 through A10 233 to be prematurely latched into latch 232.

Transferring information from the target system to the host system involves a double read. A first read from ROM socket address FFFD sets latch 228 allowing latch 232 to operate on the next read from the ROM socket. A second read from anywhere in the ROM socket address space, except for addresses FFFD and FFFF, causes the data placed on ROM address lines A2 through A9 and the target handshake level placed o ROM address line A10 to be latched into the now enabled latch 232. After the double read, the data and handshake levels on the address lines A2 through A10 233 is available for reading by the host system on target data lines TD0 through TD7 208 and target-handshake-line 207.

When a ROM socket address other than FFFC through FFFF is read, the output of AND gate 218 which connects to line 219 is low. When line 219 is low, the tri-state buffer 225 is in the hi-inpedance state and the level on output enable $\overline{OE}$ line 210 is allowed to pass directly through OR gate 234 into the ROM plugged into the optional ROM socket 216 allowing it to be read normally.

Software Operation:

The communication software running on both the host and target systems use a pair of handshake-lines, host-handshake-line 201 and target-handshake-line 207, to control the flow of data between the two systems. Depending on the direction of the data flow, one handshake-line toggles (changes from high to low or from low to high) to indicate that the data on the lines is valid and the other handshake-line toggles to acknowledge receiving the data.

Before data can be transferred in either direction, the software running on the host and target systems must be synchronized. The synchronization process is initiated by the host system. The host system instructs the target system to set the target-handshake-line 207 low if it is not already low and then it instructs the target system to set the line high then low then high again. After the described handshake-line transition sequence is carried out, each of the two systems knows the state of the other and is ready to start transferring data.

HOST AND TARGET SYNCHRONIZATION:

Synchronizing the host and target systems, getting the target-handshake-line to go high then low then high again, involves the following steps. Check to see if the target-handshake-line 207 is initially high 240. If it is high, toggle the host-handshake-level 242, assert the set-low command and the host-handshake-level 244, delay to allow the target system to respond 246 and check the level of the target-handshake-line again 240. Asserting the set-low command involves setting the host-command-line 202 high with a bit pattern recognized as set-low on host-data-line HD2 through HD7 206. Asserting the host-handshake-level involves setting the host-handshake-line 201 high or low depending on the value of the host-handshake-level variable. The loop that includes steps 240, 242, 244 and 246 is repeated until the target-handshake-line 207 goes low. Once the target-handshake-line 207 is low, toggle the host-handshake-level 248, assert the set-high command and the host-handshake level 250, delay to allow the target system to respond 252 and check the level of the target-handshake-line 254. The loop that includes steps 248, 250, 252 and 254 is repeated until the target-handshakeline 207 goes high. The level of the host-handshake-line 201 is toggled ever time through the loop to guarantee that it will match the value of the host-handshake-reference variable maintained by the target system. The value of the host-handshake-reference variable is unknown to the host and must be matched before the target system can respond to the request to set the level of the target-handshake-line 207. Once the target-handshake-line 207 is high, toggle the host-handshake-level 256, assert the set-high command and the host-handshake-level 258, delay to allow the target system to respond 260 and check the level of the target-handshake-line 262. Steps 256, 258, 260 and 262 are not repeated like the two previous analogous sequences because the target system communication software is known to be operating, having made it to step 256. During the execution of steps 240 through 254, the host system did not know if the target system was even powered up; if it received no response it had to assume it was not running yet and had to keep trying. Now that the target-handshake-line 207 is again high, toggle the host-handshake-level 264, assert the set-high command and the host-handshake-level 266, delay to allow the target system to respond 268 and check the level of the target-handshake-line 207 step 270. If the target-handshake-line 207 is high (which it should be unless there is a problem) the target-handshake-reference variable is set high 272 and the host and target systems are prepared to start transferring data.

The synchronization routine on the target system, steps 274 through 304, responds to the set-high and set-low commands issued by the host system initialization routine. The target initialization routine waits for the host-command-line 202 to go high and the host-handshake-line 201 to match the value of the host-handshake-reference variable 276. When the tests in step 276 both evaluate true, a sequence of tests and actions are performed with control ending up back at the same test block 276. The exact sequence of steps taken to get back to test block 276 is determined by a combination of the previous and current commands from the host system. Normally, the only commands that will be seen are the set-high and set-low commands specified by the bit patterns on host-data-lines HD2 through HD7 206. The current command from the host system is identified by the tests performed in steps 280 and 290. The flag set in steps 274, 286, 288, 292, 296, 302 and 303, and tested in steps 284, 294, 300 and 304 provides information on the previous command. The target systems handshake routine runs until the command sequence set-high, set-low and set-high is received from the host system at which time synchronization is completed.

Normally when two systems running asynchronous process communicate with each other, the communication ports are interrupt driven allowing either system to send data to the other. When communicating through a ROM socket, the luxury of being able to generate an interrupt when a character arrives is not available. To communicate bi-directionally in the absence of interrupts, the host system functions as the master controlling all communications. The host system both tells the target system that it wants to send data and asks the target system if it has any data to send up. The target system cannot initiate a data transfer.

To read data from the target system, the host system toggles both the target-handshake-reference variable and the host-handshake-level variable 306, asserts the request-to-receive command onto the host-handshake-line 201 and the host data lines HD2 through HD7 206, and asserts the host-handshake-level onto the host-handshake-line 201 step 308. The target-handshake-level 207 is tested to determine if it matches the value of the target-handshake-reference variable 310. If the test in step 310 does not result in a match, the test is performed a limited number of times 312 until a match is determined or the limit is exhausted. If the limit is exhausted, it is because the target system was doing something other than watching the ROM socket for communication from the host system. A failure to establish communication at this point is normal and the host will simply try again later to establish communication with the target. The target-handshake-reference variable and the host-handshake-level variable must be toggled again 314 to reverse the effects of the toggling in step 306. Because the target system was not contacted and thus unaware that the host was trying to contact it, the toggling in step 314 is necessary to make it look like the host never tried to contact the target. If the test in step 310 resulted in a match, the target-data-lines TD0, TD1 and TD2 208 are tested in 315, 318 and 320 to determine if no characters are available to be sent to the host, one character is available to be sent to the host, or multiple characters are available to be sent to the host. If there are no characters to send up, the host system continues with other tasks and tries again later. If there is one character to send up, the host system toggles both the target-handshake-reference variable and the host-handshake-level variable 322, deasserts the request-to-receive command by setting the host-command-line 202 low 324, and places the host-handshake-level onto the host-handshake-line 201 step 326. The target-handshake-line 207 is tested to determine if it matches the value of the target-handshake-reference variable 328. If the test in step 328 does not result in a match, the test is performed in a limited number of times 330 until a match is determined or the limit is exhausted. At this point it is known that the target is listening to the ROM socket for responses from the host system, thus exhausting the limit at this point is a fatal error requiring resynchronization. If the test in step 328 results in a match, the character sent from the target system is read by the host off the target-data-lines TD0 through TD7 208 step 332. If the test step 318 indicated that multiple characters were available to be sent up to the host, the target sends up to the host the number of characters to be sent. The character count is sent by going through steps 334, 336, 338, 340, 342 and 344; steps which are identical to steps 322 through 332 used to send a single data character back to the host. The multiple characters are sent to the host by going through steps 346, 348, 350, 352, 354 and 356. Steps 346 through 354 send a single character the same as steps 322 through 332 send a single character with the exception that the step to deassert the request-to-receive command 324 is not needed. The specified number of characters are sent up by executing steps 346 through 354 count number of character times 356.

READ AND WRITE OPERATION FOR HOST AND TARGET:

To write data to the target system, the host system toggles both the target-handshake-reference variable and the host-handshake-level variable 358, and determines whether a single character or multiple characters 360 are to be sent to the target system. If a single character is to be sent to the target, it asserts the single-character command onto the host-handshake-line 201 and the host data lines HD2 through HD7 206, and asserts the host-handshake-level onto the host-handshake-line 201 step 362. The target-handshake-line 207 is tested to determine if it matches the value of the target-handshake-reference variable 364. If the test in step 364 does not result in a match, the test is performed a limited number of times 336 until a match is determined or the limit is exhausted. If the limit is exhausted, it is because the target system was doing something other than watching the ROM socket for communication from the host system. A failure to establish communication at this point is normal and the host will simply try again later to establish communication with the target. The target-handshake-reference variable and the host-handshake-level variable must be toggled again 368 to reverse the effects of the toggling in step 358. If the test in step 364 results in a match, deassert the single-character command 370, toggle both the target-handshake-reference variable and the host-handshake-level variable 372, put the character to be written on the host-data-line HD0 through HD7 204, 205 and 206, and assert the host-handshake-level onto the host-handshake-line 201 step 374. Test the target-handshake-line 207 against the target-handshake-reference variable to determine if they match 376. If they do match the character has been successfully sent, and if they do not match after testing a limited number of times, it is a fatal error requiring resynchronization. If a multiple number of characters are to be sent to the target 360, steps 380, 382, 384, 386, 388, 390, 392, 394 and 396 are executed to send the character count down to the target system. The steps 380 through 396 to send down the character count are identical to steps 362 through 378 required to send down a single character. Steps 398, 400, 402, and 404 are identical to steps 372 through 378 causing a single character to be sent to the target. Steps 398 through 404 are repeated count number of character times 406 causing the specified number of characters to be sent to the target system.

The read and write routines on the target system wait for contact from the host system, the master, whenever they want to transfer data. If the target system wants to receive data from the host, it checks the host-command-line 202 to determine if it is being asserted by the host and checks the host-handshake-line 201 to determine if it matches the host-handshake-reference variable 408. If the tests in step 408 do not pass after a limited number of test 410, the system continues with other tasks on the target system. If the tests in step 408 pass, toggle the host-handshake-reference variable 412 and determine if the command from the host is a command to write a single character to the target, a command to write multiple characters to the target, or a command to receive characters from the target 414, 418, and 420. If the command is to write a single character to the target, call the routine to put a single character into the input queue 416. The routine to put a single character into the input queue, places the value of the target-handshake-level variable onto the target-handshake-line 207 step 442, toggles the target-handshake-level variable 444, calls the routine to receive a character from host 446 and puts the received character into the input queue 448. The routine to receive a character from host checks the host-command-line 202 to determine if it has been set inactive by the host and check the host-handshake-line 201 to determine if it matches the host-handshake-reference variable 450. The tests in step 450 are made until they pass. When the tests in steps 450 both pass the character is read from the host-data-lines HD0 through HD7 204, 205 and 206 step 452. The value of the target-handshake-level variable is placed on the target-handshake-line 207 step 454 and the target-handshake-level variable and host-handshake-reference variable are toggled 456 and the subroutine returns. If multiple characters are to be read from the host system 418, the system calls the routine to put multiple characters into the input queue 420. The routine to put multiple characters into the input queue puts the value in the target-handshake-level variable onto the target-handshake-line 207 step 428, toggles the target-handshake-level variable 430 and calls the routine to receive a character from the host system 432. The character received from the host system is the count of the number of characters to be received 434. The routine to receive a character from the host system is called 436 and the received character is put into the input queue 438. Steps 436 and 438 are repeated until count number of characters have been received 440 and placed into the input queue. The subroutine then returns. If the command-from-host test 418 determines that the host system has no characters to send to the host, then tell the host system that the target has no characters to sent up by setting the target-data-line TD0 208 high step 422, placing the value in the target-handshake-level variable onto the target-handshake-line 207 step 424 and toggling the target-handshake-level variable 426.

If the target system wants to write data to the host, it checks the host-command-line 202 to determine if it is being asserted by the host and checks the host-handshake-line 201 to determine if it matches the host-handshake-reference variable 466. The tests in step 466 are performed indefinitely until they pass. After the tests in step 466 pass, toggle the host-handshake-reference variable 468 and determine if the command is a request to receive characters, a request to send multiple characters or a request to send a single character 470, 472. If the command from the host was a request to write a single character or multiple characters to the target, call the routine to put a single character into the input queue 474 or call the routine to put multiple characters into the input queue 474. In either case, put single or multiple character, loop back to the start 466 of the write data to try again to receive permission to write to the host system. If the command from the host is to receive characters from the target system first determine whether a single character or multiple character 478 are available to be sent up to the host. If a single character is to be sent up to the host, set target-data-line TD1 208 high 480, place the value in the target-handshake-level variable onto the target-handshake-line 207 step 482, call the routine to send a character to the host 486 and return. The routine to send a character to the host checks to see that the host-command-line 202 is low and that the host-handshake-line 201 matches the level in the host-handshake-reference variable 458. The tests in 458 are made indefinitely until they both pass. Once the tests in 458 pass, the character to be sent is placed onto the target-data-lines TD0 through TD7 208 step 460, the value of the target-handshake-level variable is placed onto the target-handshake-line 207, the target-handshake-level and host-handshake-reference variables are toggled 468 and the subroutine returns. If multiple characters are to be sent up to the host 478, set target-data-lines TD2 208 high 488, place the value in the target-handshake-level variable onto the target-handshake-line 207 step 490, call the routine to send a character to the host to send a count of the number of characters that will be sent 492, 494 and 496. Call the routine to send a character to the host with the next character to send 498, 500 and repeat steps 498 and 500 until count number of characters have been sent 502.

INDUSTRIAL APPLICATION

From the above, it can be seen that the present invention affords the distinctive advantage of allowing transmission of data between a host computer and a microprocessor based system saving a considerable amount of development time.

Other aspects, advantages and objects of the invention can be obtained from a review of the appended claims and the drawings.

It is to be understood by one of ordinary skill in the art that other embodiments of the present invention can be developed which fall within the breadth and scope of the claims.

I claim:

1. A data transfer device for loading data into a target microprocessor based system with ROM address and data space from a host computer having a parallel printer port, wherein the host computer generates host command signals on the parallel printer port, the data transfer device comprising:
   control logic for generating control signals, wherein the control logic is responsive to host command signals and an assertion of a predetermined ROM address by the target microprocessor based system;
   a buffer memory, responsive to the control signals, for receiving data from the host computer parallel printer port and outputting the data; and
   connecting means, coupled to the buffer memory and the target microprocessor based system ROM data space, for transferring the data from the buffer memory to the target microprocessor based system ROM data space.

2. The data transfer device of claim 1, wherein the control logic includes:
   a decoder for generating control signals, the decoder coupled to the target microprocessor based system ROM address space and responsive to an assertion of a predetermined ROM address by the target microprocessor based system and host command signals, wherein the control signals include an acknowledge signal sent to the host computer.

3. The data transfer device of claim 2, wherein the data transfer device is coupled to the target microprocessor based system ROM address and data space through target microprocessor based system ROM sockets.

4. The data transfer device of claim 3, wherein the target microprocessor based system ROM sockets are further coupled to data transfer device ROM sockets with a ROM device coupled to the data transfer device ROM sockets.

5. A method for loading data into a target microprocessor based system with ROM address sockets and data sockets from a host computer having a parallel printer port, wherein the host computer generates host command signals on the parallel printer port and the target microprocessor based system generates acknowledge signals, the acknowledge signals generated in response to the assertion of ROM addresses, the method comprising the steps of:
   synchronizing the host computer to the target microprocessor base system by the target microprocessor sequentially generating the acknowledge signal in response to the generation of the host command signals by the host computer;
   asserting data by the host computer on the parallel printer port which is coupled to the target computer ROM data sockets; and
   generating an acknowledge signal to the host computer from the target microprocessor based system acknowledging the completed transfer of the data.

6. The method of claim 5, further comprising the steps of:
   compiling a data packet in the host computer, wherein the data packet includes destination address, byte count, data and check sum information; and
   reading the data packet by the target microprocessor based system and using the destination address and byte count to sequential store the data.

7. A communication device for transferring data between a host computer and a target microprocessor based system, wherein the target microprocessor based system includes ROM address space and data space, the communication device comprising:
   control logic for generating control signals, wherein the control logic is responsive to an assertion of a predetermined ROM address by the target microprocessor and a host enable signal;
   upload means, responsive to the control signals, for writing data to the ROM data space of the target microprocessor based system from the host computer; and
   download means, responsive to the control signals, for reading data from the ROM address space of the target microprocessor based system to the host computer.

8. The communication device of claim 7, wherein the upload means includes:
   a buffer memory, responsive to the control signals, having a plurality of parallel inputs coupled to the host computer and plurality of parallel outputs coupled to the ROM data space.

9. The communication device of claim 8, wherein the download means includes:
   a register, responsive to the control signals, having a plurality of parallel inputs coupled to the ROM address space and plurality of parallel outputs coupled to the host computer, wherein the register outputs data values corresponding to an asserted ROM address by the target microprocessor based system.

10. The communication device of claim 7 or 8, wherein the target microprocessor based system ROM address space and data space is coupled by:
    a target microprocessor based system ROM socket plug which is inserted into a target microprocessor based system ROM socket, wherein the ROM socket plug is further coupled to a second ROM socket which is coupled to a ROM device.

11. The communication device of claim 9, wherein the plurality of parallel inputs contain values representing host computer handshake information.

12. The communication device of claim 10, wherein the plurality of parallel outputs contain values representing target microprocessor based system handshake information.

13. A method for reading data from a target microprocessor based system having ROM address space and ROM data space by a host computer having parallel data input lines coupled to the ROM address space and having parallel data output lines coupled to the ROM data space, the method comprising the steps of:

synchronizing the host computer and the target based microprocessor based system by sequentially asserting handshake information on the host data output lines by the host computer in response to the assertion of target handshake information on the host data input lines by the target microprocessor; and outputting target microprocessor based system data by the target microprocessor to the host computer by the target asserting ROM address space which represents the target computer data.

14. The method of claim 13, wherein assertion of target handshake information is asserted by asserting ROM address space by the target microprocessor based system.

15. A method of writing data to a target microprocessor based system having ROM address space by a host computer having parallel data input lines coupled to the ROM address space and having parallel data output lines, the method comprising the steps of:

synchronizing the host computer and the target based microprocessor based system by sequentially asserting handshake information on the host data output lines by the host computer in response to the assertion of target handshake information on the host data input lines by the target microprocessor; and asserting host data values on the host computer parallel data output lines by the host computer.

* * * * *